3,305,520
POLYCARBONATES STABILIZED BY PHOSPHITES
Gerhard Fritz and Ludwig Bottenbruch, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Continuation of application Ser. No. 37,867, June 22, 1960. This application Apr. 6, 1965, Ser. No. 446,089
11 Claims. (Cl. 260—45.7)

This invention relates generally to polycarbonate plastics and more particularly, to a method for stabilizing high molecular weight linear thermoplastic polycarbonates against discoloration, and is a continuation of our copending application Serial No. 37,867, filed June 22, 1960, now abandoned.

It has been proposed heretofore to prepare high molecular weight linear thermoplastic polycarbonates by reacting di(hydroxy aryl) alkanes, di(hydroxy aryl) sulfones, di(hydroxy aryl) sulfoxides, di(hydroxy aryl) sulphites, di(hydroxy aryl) ethers or other aromatic dihydroxy compounds or mixtures of such compounds with phosgene or diesters of carbonic acid. For example, Schnell et al. in Canadian Patent 578,585, issued June 30, 1959, disclose methods for making polycarbonates in which a di(monohydroxy aryl) alkane is reacted with phosgene or a carbonic acid diester. It has been found that polycarbonates produced by these processes and others usually have a yellowish or brownish color at the time they are produced or they acquire such a color upon standing. Often, the polycarbonate plastic becomes discolored while it is being heated during a casting or other shaping process in the presence of air. Such discolorations render the polycarbonates unsuitable for making shaped articles where it is important that the plastic be colorless.

It is, therefore, an object of this invention to provide a method for avoiding the heretofore undesirable discoloration of the polycarbonate plastic. Another object of the invention is to provide a polycarbonate plastic stabilized against discoloration. More specifically, an object of the invention is to provide a method for preventing discoloration of the polycarbonate plastic. Another object of the invention is to provide a method for reducing the amount of discoloration in a polycarbonate plastic.

The foregoing objects and others are accomplished in accordance with this invention, generally speaking, by providing a method for stabilizing polycarbonate plastics against discoloration wherein the polycarbonate is maintained in admixture with a trialkyl, triaryl or mixed tri-(alkyl-aryl) phosphites. The phosphites of this invention, hereinafter referred to simply as phosphites for the sake of expediency, can be mixed with the polycarbonate during the preparation of the polycarbonate either by the reaction of a di(hydroxyaryl) alkane or other suitable dihydroxy compound with phosgene, or a diaryl carbonate, or the like. The polycarbonate can also be mixed with any suitable phosphite after the polycarbonate has already been produced and as it is being shaped such as, for example, by passing an extruded filament through a liquid containing the phosphite.

Triaryl phosphites have been used heretofore as stabilizers against heat degradation in synthetic rubber, and triphenyl phosphite alone has been used as part of a catalyst system (to prevent discoloration due to the action of the catalyst) in polyethylene terephthalates, as discussed, for example, in U.S. Patents 2,733,226 and 2,650,213. Even so, it has not been appreciated until now that all the trialkyl, triaryl or mixed tri(alkyl-aryl) phosphites of this invention are capable of achieving a most important result when admixed with any polycarbonate polymer, and that is to reduce, and in some cases, to do away altogether with the discoloration which usually takes place in a polycarbonate polymer, especially those which are formed from easily oxidizable phenols. The ability to do away with the discolorations in a polycarbonate plastic with the use of the class of compounds defined herein is a novel and unexpected result, particularly when it is considered that the action of the phosphites in reducing and preventing discoloration is a stabilizing effect, which is analogous to a catalytic effect in that it is impossible to predict for any given polymer.

Any suitable phosphite can be used in the practice of this invention including trialkyl, triaryl and mixed tri-(alkyl-aryl) phosphites. However, where a trialkyl phosphite or a mixed tri(alkyl-aryl)phosphite is being used, the alkyl radicals should preferably contain from 1 to 18 carbon atoms. Further, it is preferable that when the phosphite contains an aryl group or groups, the aryl radicals are phenyl radicals. The aryl radicals of the phosphite can either be substituted or unsubstituted. Suitable substituents on the aryl radical include alkyl radicals, alkoxy radicals, cyclohexyl radicals, and the like, and the cyclohexyl radical either may or may not be substituted with an alkyl radical. Preferably, the alkyl and/or alkoxy substituents on the aryl or cyclohexyl radical each contain from 1 to 12 carbon atoms.

Some specific phosphites which may be used in the practice of this invention are, for example, trimethyl phosphite, triisopropyl phosphite, trioctadecyl phosphite, tributyl phosphite, trioctyl phosphite, triphenyl phoshite, tri(2-methyl phenyl)phosphite, tri(4-tertiary-amylphenyl)phosphite, tri(4-tertiary-butyl phenyl)phosphite, tri(2-tertiary-butyl methyl phenyl)phosphite, tri(2-cyclohexyl phenyl)phosphite, tri(2,6-dimethyl phenyl)phosphite (B. P. 165° C. at 0.03 mm. mercury pressure), tri(2,6-diethyl phenyl)phosphite (B.P. 187° C.–189° C. at 0.12 mm. Hg), tri(2-methoxy 4-tertiary butyl phenyl)phosphite, tri(2-methyl-4-tertiary butyl phenyl)phosphite (B.P. 214° C. at 0.03 mm. Hg), tri(2-nonylphenyl)phosphite, tri(2-nonyl-6-methylphenyl)phosphite, tri(2-dodecyl phenyl)-phosphite, tri(2-dodecyl-4-tertiary butyl phenyl)phosphite, di-decyl-monophenyl-phosphite, butyldiphenyl phosphite, diisopropyl-phenyl-phosphite, octyl-di(4-tertiary butyl phenyl)phosphite, 2-methylphenyl-di(2-cyclohexyl-phenyl)phosphite, di(4-tertiary butyl phenyl-2-nonylphenyl-phosphite and the like.

Other examples of suitable phosphites which have been found to be particularly advantageous and which are therefore preferred are phosphites prepared from hydroxyalkoxybenzenes. These phosphites are especially preferred because they are particularly advantageous for use with polycarbonates produced by a transesterification process such as, for example, by reacting 2,2-(4,4'-dihydroxydiphenyl) propane with diphenyl carbonate, due to their very slight activity as cross-linking agents. Some specific examples of the latter type of phosphites are tri(beta-hydroxyethoxy benzene)phosphite; tri(hydroxy butoxy benzene)phosphite, tri(beta-hydroxyethoxy toluene)phosphite; tri(2,4-dibenzyl-beta-hydroxyethoxy benzene)phosphite; tri(2-nonyl-beta-hydroxyethoxy benzene phosphite; tri(2-methyl-4-tertiary - butyl - beta - hydroxyethoxybenzene)phosphite; di(2 - methyl - 4 - tertiary - butylphenyl), 2-methyl-4-tertiary - butyl - beta - hydroxyethoxybenzene phosphite; diphenol, beta-hydroxyethoxytoluene phosphite; di(beta-hydroxyethoxytoluene), phenol phosphite and the like. A hydroxyalkoxybenzene phosphite can contain an alkoxy chain having any desired number of carbon atoms in the alkoxy group though, preferably, the alkoxy chain should contain from 1 to 12 carbon atoms, including alkoxy groups such as, for example, methoxy, ethoxy, propoxy and the like.

Of the phosphites useful in this invention, it has been found that phosphites produced from aromatic hydroxy compounds in which the aromatic nucleus is substituted in the 2 and 4 positions or the 2 and 5 positions by an aliphatic or cycloaliphatic radical having 1 to 6 carbon atoms are particularly advantageous and preferred. Examples of such compounds are tri(2-methyl-4-tertiary butyl phenyl) phosphite (B.P. 214° C. at 0.03 mm. pressure), tri(2-tertiary butyl-4-methyl phenyl) phosphite (B.P. 182–183° C. at 0.08 mm. pressure), tri(2-tertiary butyl-5-methyl phenyl) phosphite (B.P. 202° C. at 0.06 mm. pressure) and the like. Tri(2-tertiary butyl-5-methyl phenyl) phosphite has been found to be very effective in preventing and reducing discoloration in a polycarbonate.

Any suitable method may be used to prepare the phosphites to be used in stabilizing polycarbonates against discoloration in accordance with this invention. For example, the triaryl phosphites can be prepared by heating the appropriate amount of a phenol with phosphorus trichloride, and splitting off hydrogen chloride. The aromatic or mixed aliphatic-aromatic phosphites can be prepared by an esterification process such as, for example, by esterifying triphenyl or tricresyl with the corresponding alcohol when the alcohol boils at a higher temperature than the corresponding phenol. The phosphites can be purified by fractional distillation and are obtained as colorless, partially syrupy, partially crystalline compounds.

Any amount of the phosphites of this invention will stabilize a polycarbonate polymer against discoloration and what's more, will even reduce, and in some cases, do away altogether with the discoloration which usually takes place in a polycarbonate polymer after it is formed. Preferably, however, from about 0.01 percent by weight to about 1 percent by weight of the phosphite based on the weight of the polycarbonate should be used, and most preferably, from about 0.05 percent to about 0.2 percent by weight. Caution should be exercised in the amount of the phosphite used with a particular polycarbonate polymer since amounts larger than about 1 percent will stabilize a polycarbonate against discoloration but might also deleteriously effect the mechanical properties of some polycarbonates.

The phosphites of this invention may be mixed with the polycarbonate polymer by any suitable means. Since most phosphites are oils or solids, they can be most expediently mixed with the polycarbonate in solution form using any suitable inert organic solvent for the phosphite such as, for example, benzene, petroleum ether, methylene chloride, chloroform, dioxan, carbon tetrachloride, and the like. Preferably, the solvent should have a low boiling point.

A convenient method for adding the phosphite solution to a polycarbonate is to spray the solution onto polycarbonate granules. As indicated hereinbefore, the phosphites may also be introduced into the polycarbonate during the preparation of the polycarbonate. For example, mixed aliphatic-aromatic phosphites or any other phosphite can be added to polycarbonates produced by an esterification rocess while the esterification is being effected. It is sometimes advantageous to add the phosphite to the polycarbonate by passing already shaped articles, such as bristles spun from a polycarbonate, through a bath containing the dissolved phosphite, in which case a thin phosphite film is deposited on the bristles upon evaporation of the solvent. When a polycarbonate is produced by the phosgenation of a dihydroxy compound a more or less viscous solution is usually formed which, after being washed free of electrolytes, can be mixed with the phosphite or a solution thereof to obtain an especially good homogeneous dispersion. It is often advantageous when using the latter method of admixing the phosphite with the polycarbonate to choose a phosphite which is hydrolysis resistant such as, for example, those phosphites which carry a relatively large substituent in the ortho position to the hydroxyl group including, for example, tri-o-cyclohexylphenyl phosphite, tri-2-tertiary butyl-5-methyl phenyl phosphite or the like.

Generally, all polycarbonate plastics are subject to discoloration regardless of the compounds from which they are formed or the process used in forming them, and all polycarbonate plastics can be treated according to the process of this invention, particularly, all high molecular weight, substantially linear thermoplastic polycarbonates. As indicated hereinbefore, the polycarbonate plastic can be produced from a dihydroxy diaryl alkane and phosgene or a diester of a carbonic acid such as, for example, by the process disclosed by Schnell et al. in Canadian Patent 578,585, issued June 30, 1959. Another suitable method for preparing the polycarbonate plastic to be stabilized in accordance with this invention is described in U.S. patent application Serial No. 557,256, filed by Schnell et al. January 4, 1956, now abandoned. Polycarbonates produced from dihydroxy diarylene sulfones which can be stabilized against discoloration in accordance with this invention are described in U.S. patent application Serial No. 572,793, filed by Schnell et al. March 21, 1956, now Patent No. 3,271,367. Other polycarbonates which can be stabilized against discoloration in accordance with this invention are disclosed in U.S. Patent No. 2,999,846. Still other polycarbonates which can be stabilized against discoloration are produced by the process disclosed in U.S. patent application Serial No. 746,107, filed July 2, 1958 by Schnell et al., now Patent No. 3,062,781. Since the foregoing Canadian patent and the United States applications are incorporated into this application by reference, a detailed description of methods for making polycarbonates need not be set forth herein. Suffice it to say that any and all polycarbonates may be treated according to the process of this invention, particularly those which are of the greatest commercial importance and which have molecular weights of at least about 10,000 and most preferably between about 25,000 and 150,000.

The following examples are given for the purpose of illustrating the present invention, the parts by weight and the parts by volume being in the relationship of grams to milliliters.

*Example 1*

About 4540 parts by weight Bisphenol A [2,2(4,4'-dihydroxy diphenyl) propane], and about 35 parts by weight p-tertiary-butyl phenol are reacted with about 2365 parts by weight phosgene in the presence of about 1500 parts water, about 1200 parts by weight methylene chloride and about 5150 parts by weight 45 percent sodium hydroxide solution to give a polycarbonate having a relative viscosity of 1.35 and a molecular weight of about 36,000. The highly viscous polycarbonate solution in methylene chloride is washed free of electrolytes with water in a kneader. One-half of the polycarbonate solution is immediately freed from solvent and the second half is mixed, by kneading, with a solution of about 2.5 parts by weight of tri(o-cyclohexyl-phenyl) phosphite, a triester of phosphorous acid, in about 50 parts by volume methylene chloride and subsequently freed from solvent. The granules thus obtained are spun into bristles through a worm, and the bristles are then chopped into granules. The granular material to which a phosphate has not been added has an iodine color number of 3 whereas the phosphite-containing granules have an iodine color number of 2. Both granular products are molded in an injection molding machine to give test bodies. The phosphite-free test bodies have a color number of 4 to 5 and the phosphite-containing bodies have a color number of 3 to 4.

*Example 2*

A highly viscous polycarbonate solution in methylene chloride, obtained according to Example 1, is, after washing, divided into two parts, one of which is worked-up to a granulate without the addition of phosphite and the other of which is worked-up to a granulate after the addition of about 2.5 parts by weight tri-(2-tertiary butyl-5-methyl phenyl)phosphite in about 50 parts by volume methylene chloride. After extrusion, the phosphite-containing granulate has a color number of 1 to 2 and the phosphite-free granulate has a color number of 3. The test bodies obtained from these granular materials by injection molding show color numbers of 2 and 4 to 5, respectively.

*Example 3*

A phosphite-free granulate (2500 parts by weight) obtained according to Example 1 is sprayed with frequent turning with a solution of about 2.0 parts by weight tri(o-cyclohexyl phenyl)phosphite in about 50 parts by volume petroleum ether and dried in a drying chamber. The granulate obtained after extrusion has a color number of 2 and the test bodies produced by injection molding have a color number of 3 to 4.

*Example 4*

About 7000 parts by weight Bisphenol A are transesterified to give a high molecular polycarbonate under the usual conditions with about 6600 parts by weight diphenyl carbonate and about 0.1 part by weight sodium bisphenolate as catalyst. The granuate obtained after spinning and chopping up the bristles has a color number of 3.

When about 4.0 parts by weight (0.05 percent) monophenyl-di(hydroxy-ethyl-cresyl)phosphite are added to the reaction mixture before the transesterification, then a granulate with a color number of 2 is obtained.

The iodine color number is determined in accordance with the method described in DIN, instruction No. 6162.

It is to be understood that any of the phosphites enumerated herein can be substituted for those used in the foregoing examples and that the product thus obtained will be free from discoloration. It is also to be understood that any other polycarbonate plastic can be substituted for the particular polycarbonates described in the foregoing examples.

Although the invention has been described in considerable details for the purpose of illustration, it is to be understood that variations may be made therein by those skilled in the art without departing from the spirit of the invention and the scope of the claims.

What is claimed is:
1. A polycarbonate plastic derived from a diphenol and stabilized against discoloration by a member selected from the group consisting of a trialkyl phosphite, a triaryl phosphite and a mixed tri(alkyl-aryl) phosphite.
2. The polycarbonate of claim 1 containing from about 0.01 to about 1 percent of the group member.
3. The polycarbonate of claim 1 containing from about 0.05 to about 0.2 percent of the group member.
4. The polycarbonate of claim 1 wherein the group member contains at least one radical which is the residue of an aromatic hydroxy compound in which the aromatic nucleus is substituted in the 2 and 4 positions with an aliphatic radical having from 1 to 6 carbon atoms.
5. The polycarbonate of claim 1 wherein the group member contains at least one radical which is the residue of an aromatic hydroxy compound in which the aromatic nucleus is substituted in the 2 and 5 positions with an aliphatic radical having from 1 to 6 carbon atoms.
6. The stabilized polycarbonate of claim 1 wherein the group member has both aliphatic and aromatic radicals.
7. The stabilized polycarbonate of claim 1 where the group member contains an aliphatic radical containing from 1 to 18 carbon atoms.
8. The stabilized polycarbonate of claim 1 wherein the group member is a triaryl phosphite.
9. The polycarbonate of claim 6 where the said alkyl-aryl phosphite is tri(ortho-cyclohexyl phenyl) phosphite.
10. The polycarbonate of claim 6 wherein the said alkyl-aryl phosphite is tri(2-tertiary butyl-5-methyl phenyl) phosphite.
11. The polycarbonate of claim 6 wherein the said alkyl-aryl phosphite is trialkylphenyl phosphite.

References Cited by the Examiner
UNITED STATES PATENTS

| | | | |
|---|---|---|---|
| 3,043,808 | 7/1962 | Hagemeyer | 260—75 |
| 3,053,810 | 9/1962 | Griehl et al. | 260—77.5 |

DONALD E. CZAJA, *Primary Examiner.*

LEON J. BERCOVITZ, *Examiner.*

M. J. WELSH, *Assistant Examiner.*